(12) United States Patent
Altmann et al.

(10) Patent No.: US 7,975,819 B2
(45) Date of Patent: Jul. 12, 2011

(54) BUSHING-TYPE ROLLER OVERRUNNING CLUTCH WITH A SOLID OUTER RING

(75) Inventors: Frieder Altmann, Pommersfelden (DE); Swen Dörrie, Herzogenaurach (DE); Werner Wirth, Gerhardshofen (DE); Volker Ploetz, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 616 days.

(21) Appl. No.: 11/989,208

(22) PCT Filed: Jul. 11, 2006

(86) PCT No.: PCT/EP2006/006743
§ 371 (c)(1),
(2), (4) Date: Feb. 21, 2008

(87) PCT Pub. No.: WO2007/009629
PCT Pub. Date: Jan. 25, 2007

(65) Prior Publication Data
US 2009/0032365 A1 Feb. 5, 2009

(30) Foreign Application Priority Data
Jul. 21, 2005 (DE) .................. 10 2005 034 038

(51) Int. Cl.
*F16D 41/067* (2006.01)
(52) U.S. Cl. .................. 192/45; 192/107 T; 60/345

(58) Field of Classification Search .................. 192/45; 188/82.84; 60/345
See application file for complete search history.

(56) References Cited

U.S. PATENT DOCUMENTS

| | | | | |
|---|---|---|---|---|
| 3,339,687 A | * | 9/1967 | Cowles | 192/45 |
| 3,528,534 A | * | 9/1970 | Benson et al. | 192/45 |
| 5,586,434 A | * | 12/1996 | Okubo et al. | 60/345 |
| 5,617,937 A | | 4/1997 | Zettner | |
| 5,779,014 A | * | 7/1998 | Kinoshita et al. | 192/41 R |

FOREIGN PATENT DOCUMENTS

| | | |
|---|---|---|
| DE | 1 272 056 | 7/1968 |
| DE | 17 77 169 A1 | 7/1971 |
| DE | 2 022 144 * | 11/1971 |
| DE | 17 50 493 A1 | 4/1972 |
| DE | 2 225 394 * | 12/1973 |
| DE | 2 301 209 * | 7/1974 |
| DE | 33 45 827 A1 | 6/1985 |
| DE | 42 10 560 A1 | 10/1993 |
| DE | 195 32 923 A1 | 3/1996 |
| EP | 0 549 824 A | 7/1993 |

* cited by examiner

Primary Examiner — Richard M. Lorence
(74) Attorney, Agent, or Firm — Charles A. Muserlian

(57) ABSTRACT

A bushing-type roller overrunning dutch comprising an inner and/or outer ring (4), clamping ramps (2) adapted to the needles or rollers (5), a cage (6), pressure springs (7) for the needles or rollers (5), a bushing (1) with integrally formed clamping ramps (2), and a solid inner or outer ring (4) in or on which the bushing (1) is fixed.

12 Claims, 3 Drawing Sheets

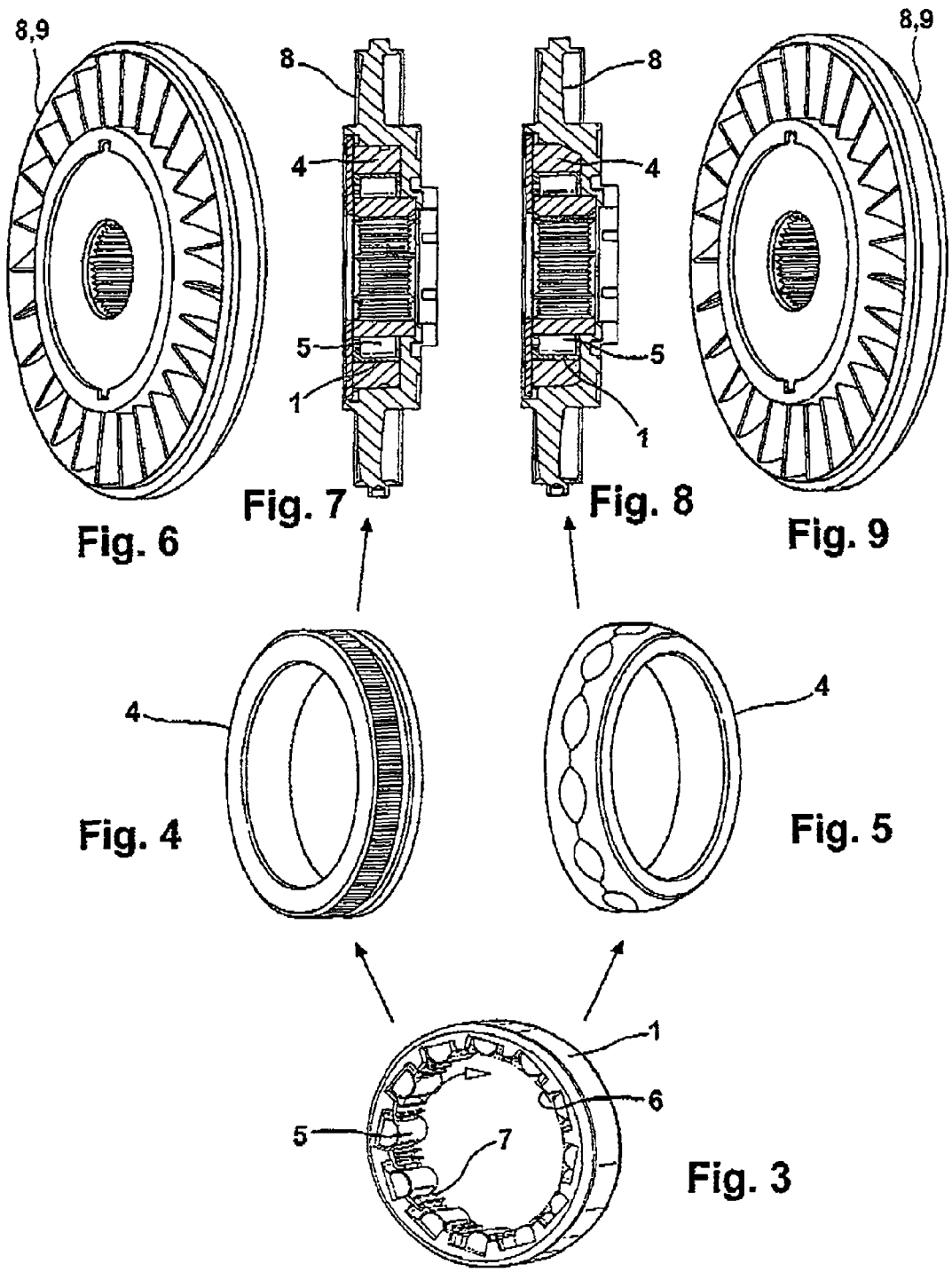

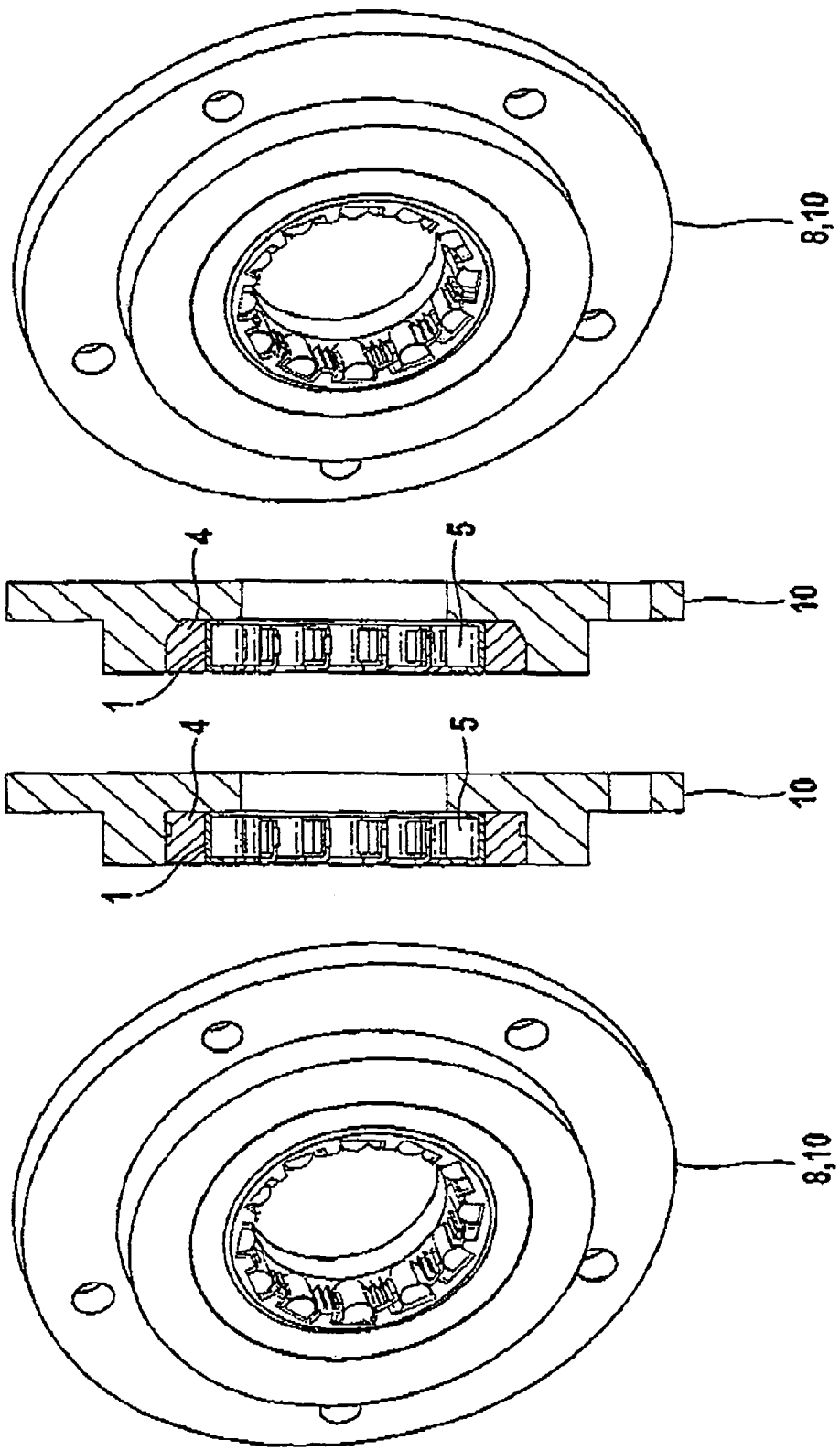

BUSHING-TYPE ROLLER OVERRUNNING CLUTCH WITH A SOLID OUTER RING

This application is a 371 of PCT/EP2006/006743 filed Jul. 11, 2006.

FIELD OF THE INVENTION

Bushing-type roller overrunning dutch comprising an inner and/or outer ring, clamping ramps adapted to the needles or rollers, a cage and pressure springs for the needles or rollers.

BACKGROUND OF THE INVENTION

Such overrunning clutches for the transmission of higher forces are known. Usually, in such overrunning clutches, clamping ramps operatively connected to the rollers are arranged on the inner surface of the outer ring. It is also possible to arrange clamping ramps on the outer surface of an inner ring. The rollers are supported on a smooth shaft or a smooth inner ring or on the inner surface of a smooth outer ring. In such overrunning clutches for high forces, it is particularly the outer rings that must have an adequate thickness so that the required strength is assured. It is known to make these outer rings by sintering but the strength of such rings, however, particularly at the clamping ramps, does not always meet the requirements. It is also known, in particular, to broach the inner space with clamping ramps but this necessitates complex coordination measures in the production flow. In addition, during series production, an individual tool monitoring and detailed planning are required. By reason of the manufacturing method, the surface of the broached profile is not optimal and may have a striated texture that can increase the danger of fracture. In addition, a broaching tool has a short service life.

It can therefore be recapitulated that neither the sintered nor the broached rings, particularly, outer rings of overrunning clutches for high forces meet the requirements, particularly those of a cost-effective series production.

OBJECTS OF THE INVENTION

It is therefore an object of the invention to improve an overrunning dutch of the generic type so that it can be manufactured in a simple and cost-effective manner, particularly also in mass production, and also meets the quality requirements.

This and other objects and advantages of the invention will become obvious from the following detailed description.

SUMMARY OF THE INVENTION

The invention achieves the above objects with a bushing comprising integrally formed clamping ramps and with a solid inner or outer ring in or on which the bushing is fixed.

This means that a separation is effected between the region of the clamping ramps which can only be manufactured by complex procedures and the actual support ring that can be made in a simple and economic manner. Advantageously, the bushing and the ring are fixed on or in each other by an interference fit. The bushing can comprise, at least on one side, a radially oriented annular shoulder that forms a stop for the cage or the rollers. The surface of the inner or outer ring facing the bushing and the surface of the bushing facing the inner or outer ring have a smooth or a rippled configuration, so that a continuous firm fit is guaranteed between these two components and a full support of the bushing is effected.

According to a further development of the invention, the bushing is made of thin-walled strip material and the clamping ramps are integrally formed thereon by stamping, the bushing is shaped into a ring whose ends are joined together in abutting relationship. They can, for example, be welded to each other or subjected frontally to a strong pressure by the interference fit. However, according to another provision of the invention, the bushing may also be made by a shaping method or by deep-drawing which also enables the production of thin-walled bushings with integrally formed clamping ramps.

With these proposed fabrication methods bushings with high strength and a high surface quality are obtained, particularly also on the clamping ramps, so that these can then likewise be manufactured economically.

The solid inner or outer ring can also be made economically as a simple turned part and a laterally arranged, radially oriented collar can be integrally formed thereon which, after the ring has been joined to the bushing is situated on the side turned away from the annular shoulder of the bushing.

The outer or the inner ring as well as the overlap between the bushing and the support ring, that is to say, the outer or the inner ring, must be dimensioned so that the bushing is adequately supported. Attention must also be paid to the limited strength of the material of the bushing under load. Advantageously, the thickness ratio between the minimum thickness of the outer or inner ring measured in radial direction and the thickness of the bushing that is supported by the outer or inner ring and comprises the clamping ramps is at least 5:1.

According to an advantageous development, the outer ring is inserted rotationally fast into a surrounding component, particularly a flanged housing, or into a stator of a torque converter. Irrespective of whether the connection between the outer ring of the overrunning clutch and the surrounding component is made by pressing-in or by casting-in, torques of more than 200 Nm can be transmitted. Suitable base materials for making the component surrounding the outer ring are, for instance, light metals, particularly aluminum or magnesium alloys and also plastics. A particular advantage of all variants is that the bore of the outer ring does not need to have any particular raceway quality and, in particular, that it can be used without heat treatment.

BRIEF DESCRIPTION OF THE DRAWINGS

For further elucidation, the invention will now be described with reference to the appended drawings in which several examples of embodiment of the invention are illustrated in a simplified manner.

FIG. 3 shows the bushing of FIG. 1 with inserted cage, clamping rollers and pressure springs, FIGS. 4 and 5 show, each one, an outer ring that is compatible with the bushing of FIG. 3 and is intended for pressing-in or casting-in, FIGS. 6 and 7 show a perspective view and a sectional representation of a stator of a torque converter comprising an overrunning clutch arrangement including the pressed-in outer ring of FIG. 4, FIGS. 8 and 9 show, in representations analogous to FIGS. 6 and 7, a stator comprising an overrunning clutch arrangement including the cast-in outer ring of FIG. 5, and FIGS. 10 to 13 show, in representations analogous to FIGS. 6 to 9, a flanged housing comprising an overrunning clutch arrangement including respectively the pressed-in outer ring of FIG. 4 and the cast-in outer ring of FIG. 5.

DETAILED DESCRIPTION OF THE DRAWINGS

Figure 1:
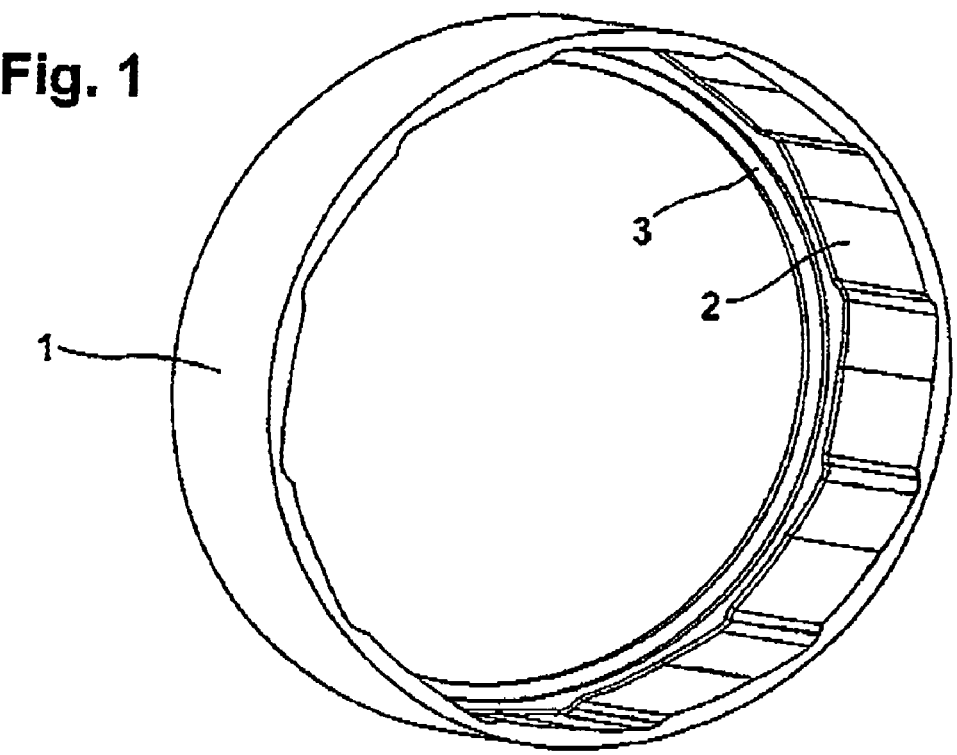
FIG. 1 is a perspective view of a bushing comprising integrally formed clamping ramps.
Figure 2:
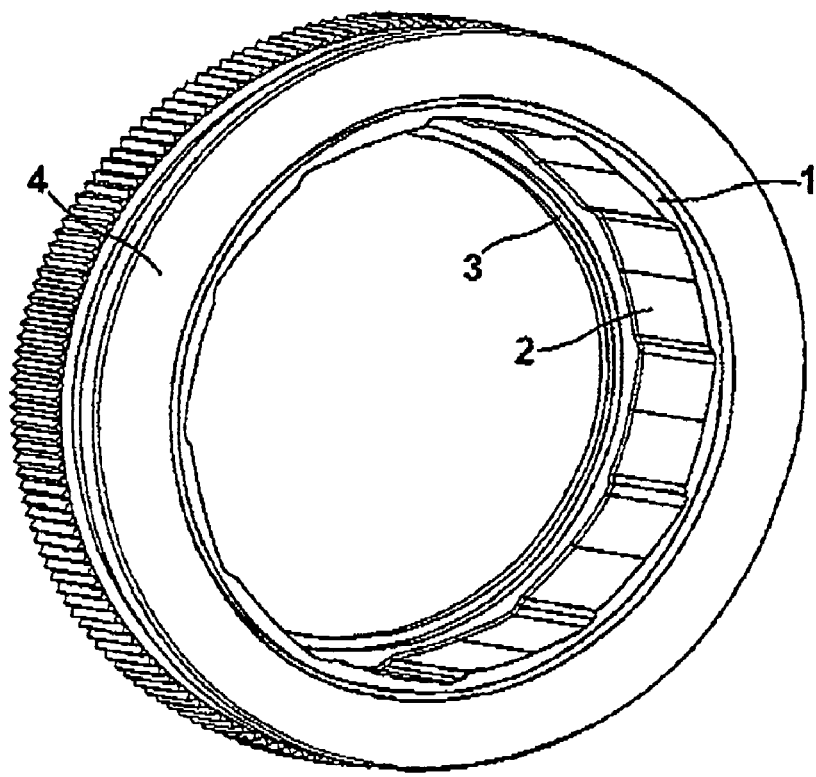
FIG. 2 is a perspective view of the bushing of FIG. 1, the bushing being inserted into an outer ring.

In FIGS. 1 and 2, as far as shown in the particular figure, a bushing is identified at 1 and comprises on an inner side, integrally formed clamping ramps 2. The bushing 1 is made without chip removal as a sheet metal part and comprises, in addition to the clamping ramps 2, a radially inwards oriented annular shoulder identified at 3. Needles or rollers, not shown, are arranged on the clamping ramps 2 and guided in a cage, not shown, while being pressed into their respective clamping positions by pressure springs.

As illustrated in FIG. 2, the bushing 1 is inserted into an outer ring 4 that is made as a turned part, the bushing 1 being pressed in so as to be fully supported on the outer ring 4 that, in turn, is pressed into a further component. For raising the seat of the outer ring 4, a rippled structure is applied to the outer surface of the outer ring 4. Due to the clamping ramps 2, the bushing 1 has a non-uniform thickness, also called wall thickness. The minimum thickness of the outer ring 4 measured in the same direction, i.e. in the radial direction, is at least 5 times the smallest thickness of the bushing 1. The outer ring 4 thus prevents any significant deformations of the bushing 1 under load, the stability of the entire arrangement being further enhanced by the further component, not illustrated, that is likewise made of metal and is, for instance, a cast, turned or milled part.

FIG. 3 shows, in addition to the bushing 1, a cage 6 that is retained in the bushing 1 or made in one piece with the bushing 1. Pressure springs 7 attached to the cage 6 bias clamping rollers 5 permanently with a force in the direction of their clamping position. The arrangement of FIG. 3 thus comprises all parts of an overrunning clutch with the exception of the outer ring 4.

FIGS. 4 and 5 illustrate different designs of an outer ring 4 that can be connected to bushing 1 in the manner described with reference to FIGS. 1 and 2. While the rippled outer ring 4 of FIG. 4 is particularly suitable for being pressed into a surrounding component 8, the outer ring 4 illustrated in FIG. 5 is intended for being cast into a surrounding component 8. As can be seen in FIGS. 6 to 9, the surrounding component 8 in both cases is a stator 9 of a torque converter, not illustrated. The function of a stator in a hydraulic torque converter is known in principle, for instance, from DE 102 30 650 A1. The stator 9 into which the outer ring 4 is pressed or cast is made of a plastic or a light metal alloy. The same applies to a flanged housing 10 illustrated in FIGS. 10 to 13 that constitutes the component 8 surrounding the outer ring 4.

The invention claimed is:

1. Sleeve/roller freewheel with an inner and/or outer ring, with clamping ramps matched to needles or rollers, with a cage and with press-on springs for the needles or rollers, and with a sleeve having said clamping ramps integrally formed thereon, wherein the inner or outer ring is of solid design and the sleeve is fastened thereon or therein, and a component, namely a guide wheel of a torque converter, which surrounds the outer ring and into which the outer ring is inserted in a rotationally fixed manner, the minimum thickness of the outer ring being at least five times the smallest thickness of the sleeve and the torque which can be transmitted between the inner and outer ring being at least 200 Nm.

2. Sleeve/roller freewheel according to claim 1 wherein that surface of the inner or outer ring which faces the sleeve and/or that surface of the sleeve which faces the inner or outer ring are/is of smooth or corrugated design.

3. Sleeve/roller freewheel according to claim 1 wherein the sleeve and the inner or outer ring are supported against each other by means of a press fit.

4. Sleeve/roller freewheel according to claim 1 wherein the sleeve has a radially oriented annular shoulder at least on one side.

5. Sleeve/roller freewheel according to claim 4 wherein the sleeve together with clamping ramps and, if optionally, an annular shoulder is produced by deformation or deep-drawing.

6. Sleeve/roller freewheel according to claim 4 wherein the solid inner or outer ring has a laterally arranged, radially oriented collar which, after the outer ring is joined to the sleeve, is arranged on a side facing away from the annular shoulder of the sleeve.

7. Sleeve/roller freewheel according to claim 1 wherein the sleeve is produced from strip stock with the clamping ramps integrally formed thereon by stamping, and the sleeve is shaped to form a ring, the ends of which are joined together in an abutting relationship.

8. Sleeve/roller freewheel according to claim 1 wherein the outer ring is cast into the surrounding component.

9. Sleeve/roller freewheel according to claim 1 wherein the outer ring is pressed into the surrounding component.

10. Sleeve/roller freewheel according to claim 1 wherein the surrounding component is manufactured from plastic.

11. Sleeve/roller freewheel according to claim 1 wherein the surrounding component is manufactured from light metal.

12. Sleeve/roller freewheel with an inner and/or outer ring, with clamping ramps matched to needles or rollers, with a cage and with press-on springs for the needles or rollers, and with a sleeve having said clamping ramps integrally formed thereon, wherein the inner or outer ring is of solid design and the sleeve is fastened thereon or therein, and a component, namely a flange housing, which surrounds the outer ring and into which the outer ring is inserted in a rotationally fixed manner, the minimum thickness of the outer ring being at least five times the smallest thickness of the sleeve and the torque which can be transmitted between the inner and outer ring being at least 200 Nm.

* * * * *